United States Patent [19]
McGahren

[11] 3,914,317
[45] Oct. 21, 1975

[54] ANTIFUNGAL COMPOUNDS

[75] Inventor: William James McGahren, Demarest, N.J.

[73] Assignee: American Cyanamid Company, Stamford, Conn.

[22] Filed: June 12, 1974

[21] Appl. No.: 478,666

Related U.S. Application Data

[63] Continuation-in-part of Ser. No. 393,373, Aug. 31, 1973, abandoned.

[52] U.S. Cl. .................................. 260/592; 424/331
[51] Int. Cl. .............................................. C07c 49/76
[58] Field of Search ..................................... 260/592

[56] References Cited
UNITED STATES PATENTS

| | | | |
|---|---|---|---|
| 2,322,036 | 6/1943 | Lieber et al. | 260/592 |
| 3,499,751 | 3/1970 | Wood et al. | 260/592 |
| 3,555,075 | 1/1971 | McGahren et al. | 260/592 |

*Primary Examiner*—Leon Zitver
*Assistant Examiner*—James H. Reamer
*Attorney, Agent, or Firm*—Edward A. Conroy, Jr.

[57] ABSTRACT

This disclosure describes two new compounds, 3-chloro-1',2'-dihydro-1'$\beta$,2'$\beta$,6-trimethyl-1'-propionaphthone and 3-methoxy-1',2'-dihydro-1'$\beta$,2'$\beta$,6-trimethyl-1'-propionaphthone, which are useful as antifungal agents.

2 Claims, No Drawings

ANTIFUNGAL COMPOUNDS

CROSS REFERENCE TO RELATED APPLICATION

This application is a continuation-in-part of my copending application Ser. No. 393,373, filed Aug. 31, 1973 now abandoned.

BRIEF SUMMARY OF THE INVENTION

This invention relates to two new organic compounds, 3-chloro-1', 2'-dihydro-1'$\beta$, 2'$\beta$, 6-trimethyl-1'-propionaphthone (I) and 3-methoxy-1', 2'-dihydro-1'$\beta$, 2'$\beta$, 6-trimethyl-1'-propionaphtone (II) which may be represented by the following general formulae:

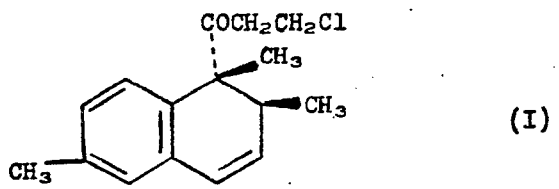

(I)

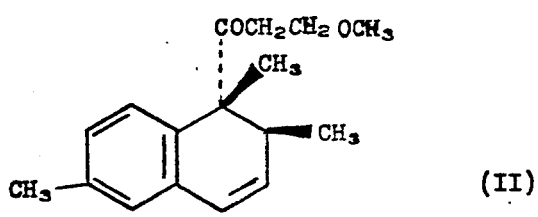

(II)

These novel compounds are prepared by rearrangement of 2,3,4a,8,9,10,10a,10$\beta$-octahydro-10$\alpha$-hydroxy-4a$\beta$,8$\beta$,10b$\beta$-trimethyl-1H-naphtho[2,1-b]pyran-1-one (III) which may be represented by the following formula:

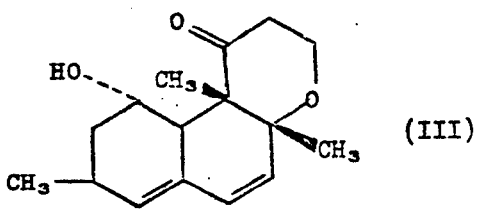

(III)

It is obtained as a fermentation product the aerobic fermentation of Sporormia affinis NRRL 3314. In accordance with the present invention, (III) is treated with refluxing dilute hydrochloric acid solution in dioxane to yield (I), and (III) is treated with refluxing methanolic hydrogen chloride to yield (II).

DETAILED DESCRIPTION OF THE INVENTION

The novel compounds of the present invention are useful as antifungal agents and posses broad-spectrum antifungal activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of fungal growth is noted. The minimal inhibitory concentration (expressed in micrograms per milliliter) is defined as the concentration of test compound causing complete inhibition of growth of any particular organism.

In a representative operation, the minimal inhibitory concentration of the compounds of this invention against typical test organisms as determined in the above-described assay are set forth in Table I below:

TABLE I

| Organism | Minimal Inhibitory Conc. (mcg./ml.) | |
|---|---|---|
| | Compound I | Compound II |
| Cryptococcus neoformans SP(E138) | 100 | 100 |
| Microsporum canis ATCC10214 (E55) | 2.5 | 10 |
| Microporum gypseum ATCC14683 (E130) | 10 | 50 |
| Trichophyton tonsurans NIH662 (E10) | 5 | 25 |
| Trichophyton mentagrophytes (E11) | 2.5 | 25 |
| Trichophyton rubrum (E97) | 10 | 50 |
| Mycobacterium smegamits | 100 | 25 |
| Staphylococcus aureus ATCC14151 | 10 | |

As antifungals the compounds of this invention may be administered orally or parenterally in the usual pharmaceutical forms, or possibly in the diet, and/or as compositions of active ingredient in an edible carrier. Such compositions may include tablets, scored or unscored, or hard or soft shell capsules. Excipients may include lactose, starch, buffers, disentegrating agents, lubricants, homogenizing agents, and the like. Oral and parenteral compositions may include similar agents and also preservatives, emulsifiers, surfactants, stabilizers and the like in solutions, suspensions, syrups, elixirs, etc. in either aqueous or non-aqueous systems. Additional excipients might include sweetners, flavorings, colorings, or perfumes. Topical preparations, it is expected, will prove particularly useful. Such compositions would be designed for administration to subjects exposed to, or infected with sensitive fungi for either treatment or prophylaxis and may include, in addition to the foregoing, ointments, creams, emulsions, unguents, salves, emollients, sprays, washes or the like. In addition, compounds of this invention may be used in the form of solutions, suspensions, emulsion, washes, powders, dusts, mists, soaps, sprays, aerosols drenches, or other forms for the purpose of cleaning, disinfecting, or sterilizing surgical instruments, laboratory glassware or instruments, hospital walls or other surfaces, linens, dishes, laboratory tables, coops, cages, or the like. Likewise these compounds might be incorporated into soaps, detergents, sprays or the like in the home, farm, office or elsewhere with the purpose of preventing or minimizing infection or contamination with sensitive fungi. Painting, spraying, immersion or other means of effecting contact may be applied.

The invention will be described in greater detail in conjuction with the following specific examples.

EXAMPLE 1

Preparation of 2,3,4a,8,9,10,10a,10β-octahydro-10α-hydroxy-4aβ-8β-10bβ-trimethyl-1H-naphtho[2,1-b]pyran-1-one

Inoculum Preparation

A medium used to grow the primary inoculum was prepared according to the following formula:

|  | Grams |
| --- | --- |
| Soybean meal | 10 |
| Glucose | 20 |
| Corn steep liquor | 5 |
| Calcium carbonate | 3 |
| Water to 1,000 milliliters. | |

The washed or scraped spores from an agar slant of *Sporormia affinis* NRRL 3314 were used to inoculate two 500 ml. flasks containing 100 milliliters each of the above medium. The flasks were placed on a rotary shaker and agitated vigorously for 48 hours at 28°C. The resulting flask inoculum was transferred to a 5 gallon glass fermentor containing 12 liters of sterile medium. The glass fermentor was aerated with sterile air while growth was carried out for about 48 hours, after which the contents were used to seed a 300 liter tank fermentor.

Fermentation

A fermentation medium was prepared according to the following formula:

|  | Grams |
| --- | --- |
| Corn starch | 15 |
| Cerelose | 10 |
| Beef extract | 5 |
| Bacto-Peptone | 5 |
| Sodium chloride | 5 |
| Dipotassium hydrogen phosphate | 0–5 |
| Soya flour | 10 |
| Water to 1,000 milliliters. | |

The fermentation medium was sterilized at 120°C. with steam at 20 pounds pressure for 45–60 minutes. The pH of the medium after sterilization was pH 6.0. 300 Liters of sterile medium in a 400 liter tank fermentor was inoculated with 12 liters of inoculum prepared as described above, and the fermentation was carried out at 28°C. using Hodag LG-8 oil as a defoaming agent. Aeration was supplied at the rate of 0.5 liter of sterile air per liter of mash per minute. The mash was agitated by an impeller driven at 200 revolutions per minute. At the end of approximately 120 hours of fermentation time, the mash was harvested.

Isolation

To 300 liters of fermented mash was added diatomaceous earth in the proportion of 3% weight per volume. The broth was filtered, the filter cake washed with about 30 liters of water, and the filtrate and wash combined. The mycelial cake was discarded. The combined filtrate and washings were adjusted to pH 7.0 and 6.0 kg. of Darco-G60 was added and the mixture was stirred for 30 minutes and then filtered. The carbon pad was washed with water and the filtrate and washings were discarded. The carbon pad was slurried and extracted with about 60 liters of a 90:10 mixture of acetone and water adjusted to pH 2.5 with hydrochloric acid and the extract later concentrated under reduced pressure to remove the acetone. The resultant agueous phase was extracted with chloroform and the chloroform extract was concentrated to a gum. This gum was charged on to 350 g. of silica gel and eluted with the solvent system chloroform: hexane as 4:1. Fractions of 1 liter volume were collected. Fractions 4 through 11 were combined and concentrated under reduced pressure to 11 g. of oily material from which 2.5 g. of solids precipitated. This solid material was taken up in ethyl acetate and the solution decolorized using charcoal. The resultant clear solution was concentrated, diluted with hexane, and allowed to stand at ambient temperature. Crystals appeared in the solution after some time. These were collected and after suitable drying yielded 2.0 G. of white crystalline 2,3,4a,8,9,10,10a,10β-octahydro-10α-hydroxy-4aβ,8β,10bβ-trimethyl-1H-naphtho[2,1-b]pyran-1-one; m.p. 173°–173.5°C., $[\alpha]_D^{25} = -113° \pm 2.0°$ (C, 1.053 CH$_3$OH). Anal. calcd for C$_{16}$H$_{20}$O$_3$: C, 73.25; H, 8.45. Found: C, 73.26; H, 8.19.

EXAMPLE 2

Preparation of 3-chloro-1',2'-dihydro-1'β,2'β,6-trimethyl-1'-propionaphthone

A 500 mg. portion of the product of Example 1 was refluxed in 20 ml. of dioxane with 7 ml. of 6N HCl solution added. After 8 hours the dioxane was evaporated and the resultant aqueous emulsion was extracted with CHCl$_3$. The CHCl$_3$ extract was dried over anhydrous MgSO$_4$ and concentrated to an oil which was purified by partition chromatography over diatomaceous earth using the system heptane/acetonitrile. About 180 mg. of a pure oil which was shown to be the title compound of Example 2 were recovered. Optical rotation $[\alpha]_D^{25}= -78.5° \pm 2.0°$ (C=0.43 $CH_3OH$). Analysis calculated for $C_{16}H_{19}OCl$: C, 73.16; H, 7.23; Cl, 13.14; found: C, 73.24; H, 7.51; Cl, 12.94.

EXAMPLE 3

Preparation of 3-methoxy-1',2'-dihydro-1'β,2'β,6-trimethyl-1'-propionaphthone

A 25 ml. portion of methanol is saturated with dry HCl gas and a 500 mg. portion of the product of Example 1 is added. The solution is refluxed for 4 hours with protection from moisture. The solvent is evaporated and the resultant oil is taken up in chloroform and extracted with sodium bicarbonate solution. The chloroform solution is dried and concentrated to 480 mg. of oil. This oil is purified by partition chromatography over diatomaceous earth using the system heptane/acetonitrile. The yield of the title compound of Example 3 was 250 mg. as a colorless oil. Optical rotation $[\alpha]_D^{25} = -83.5° \pm 3.0°$ (C=1.10 $CH_3OH$). Analysis calculated for $C_{17}H_{22}O_2$: C, 79.07; H, 8.58; found: C, 79.22; H, 8.08.

What is claimed is:

1. 3-Chloro-1',2'-dihydro-1'β,2'β,6-trimethyl-1'-propionaphthone.

2. The process of preparing 3-chloro-1',2'-dihydro-1'β,2'β,6-trimethyl-1'-propionaphthone which comprises heating 2,3,4a,8,9,10,10a,10β-octahydro-10α-hydroxy-4aβ,8β-10bβ-trimethyl-1H-naphtho[2,1-b]pyran-1-one in a solution of dilute hydrochloric acid in dioxane at reflux temperature for a period of time sufficient for a substantial degree of rearrangement to occur.

* * * * *